United States Patent [19]

Kwon

[11] Patent Number: 5,450,258
[45] Date of Patent: Sep. 12, 1995

[54] LOADING DEVICE FOR A CASSETTE TAPE RECORDER

[75] Inventor: Seog H. Kwon, Seoul, Rep. of Korea

[73] Assignee: Samsung Electronics Co., Ltd., Kyungki-Do, Rep. of Korea

[21] Appl. No.: 203,030

[22] Filed: Feb. 28, 1994

[30] Foreign Application Priority Data

Feb. 26, 1993 [KR] Rep. of Korea .................. 93-2749

[51] Int. Cl.⁶ ............................................. G11B 5/027
[52] U.S. Cl. ...................................................... 60/85
[58] Field of Search ............................. 360/84, 85, 95

[56] References Cited

U.S. PATENT DOCUMENTS

| | | | |
|---|---|---|---|
| 4,748,521 | 5/1988 | Osawa et al. | 360/85 |
| 4,785,362 | 11/1988 | Nozawa et al. | 360/85 |
| 5,168,399 | 12/1992 | Kano et al. | 360/85 |
| 5,222,004 | 6/1993 | Chae et al. | 360/85 |
| 5,285,332 | 2/1994 | Konishi et al. | 360/85 |

FOREIGN PATENT DOCUMENTS 0198102 10/1986 European Pat. Off. .............. 360/85

Primary Examiner—John H. Wolff
Attorney, Agent, or Firm—Sughrue, Mion, Zinn, Macpeak & Seas

[57] ABSTRACT

A loading device for a magnetic cassette tape recorder includes a ring gear to load and unload a magnetic tape from a tape cassette onto a drum. A guide rail including a fixing groove on the guide rail is provided for mounting the ring gear and includes a rib provided with projections and single stepped portions formed by a certain gap. The construction simplifies the assembly process and prevents the ring gear from deviating outwardly while rotating without any additional fixing means.

5 Claims, 3 Drawing Sheets

LOADING DEVICE FOR A CASSETTE TAPE RECORDER

BACKGROUND OF THE INVENTION

This invention relates to a loading device for a cassette tape recorder, and more particularly to a loading device which comprises a ring gear for loading and unloading a tape onto and from a drum, the tape being provided in a tape cassette mounted on a supply reel and a take-up reel on a tape deck, and a guide rail for mounting the ring gear to prevent deviation during its rotation.

As shown in FIG. 1, a conventional loading device for a cassette tape recorder used for video cassette recorders (VCRs), digital audio tapes (DATs), and subminiature camcorders, comprises a rotation drum 11 mounted in the middle of a deck 10 and a plurality of heads (not illustrated) for recording and reproducing signals to and from a magnetic tape traveling along a certain travel path on the drum 11.

A capstan motor 12, mounted on the deck 10, provides the power to transfer or load the magnetic tape on the supply reel and the take-up reel (not illustrated) to the drum 11. An arm 14 is fixed on one end of a control means 13 for converting the power of the capstan motor 12. On the arm 14, a power converting means 15 comprising first and second gear parts 16, 17 being engaged with each other is fixedly mounted on the deck 10 by a shaft 18.

A series of first through fourth gears 19, 20, 21, and 22 are sequentially engaged with each other for transmitting power of the capstan motor 12 via the power converting means 15 to a ring gear 24 of a loading device 23.

As shown in FIGS. 2 and 3, a plurality of supporting members 25, having shoulders 25a, are fixedly mounted on the deck 10. The inner end of ring gear 24 is mounted on the shoulder 25a so as to rotate outwardly on the upper portion of each supporting member 25 so as to prevent the ring gear 24 from deviating outwardly while the ring gear is rotating.

In a conventional loading device of the type described above, when loading the tape onto the drum, the capstan motor 12 rotates in a clockwise direction, and the power therefrom is selectively transferred to the power converting means 15 and properly reduced by the series of the first through the fourth gears 19–22, which are engaged with the second gear part 17 of the power converting means 15. The ring gear 24 engaged with the fourth gear 22 rotates in a counterclockwise direction, thereby moving a pole base 27 in the direction to load the magnetic tape onto the drum 11.

When unloading the magnetic tape, the capstan motor 12 is rotated in a counterclockwise direction, and the power therefrom is transferred to the power converting means 15 and the series of the first to the fourth gears 19–22, so that the ring gear 24 engaged with the fourth gear 22 is rotated in a clockwise direction, thereby moving the pole base 27 in a direction to unload the magnetic tape from the drum.

When the ring gear 24 rotates in a clockwise or counterclockwise direction, the fixing members 26 prevent the ring gear 24 from deviating by holding the ring gear 24 at the upper portion of the supporting members 25.

However, according to the conventional tape loading device as above, since a plurality of supporting members is required for mounting the ring gear rotatably and a plurality of fixing members is required for preventing the ring gear from deviation while it is rotating, the device has disadvantages in that the number of components is large and the assembly process is complicated.

SUMMARY OF THE INVENTION

An object of the present invention is to solve the above-mentioned problems of the prior art.

Therefore, an object of the present invention is to provide a loading device for a cassette tape recorder comprising a ring gear for loading and unloading the magnetic tape safely mounted on the supply reel and the take-up reel positioned on the deck, and a guide rail for mounting the ring gear more stably without any separate fixing member for preventing the ring gear from deviating outwardly, reducing the number of components, thereby simplifying the assembly process.

The objects of the present invention are achieved by providing a loading device for a magnetic cassette tape recorder to load and unload a magnetic tape safely mounted on the supply reel and the take-up reel to and from a drum by means of a ring gear mounted on a deck, comprising: a fixing groove formed at the inside of the inner diameter of said ring gear and a guide rail for mounting said ring gear by being inserted into said fixing groove.

DETAILED DESCRIPTION OF A PREFERRED EMBODIMENT

A preferred embodiment of a loading device for a magnetic cassette tape recorder according to the present invention will be explained in detail with respect to the attached drawings.

Figure 1:
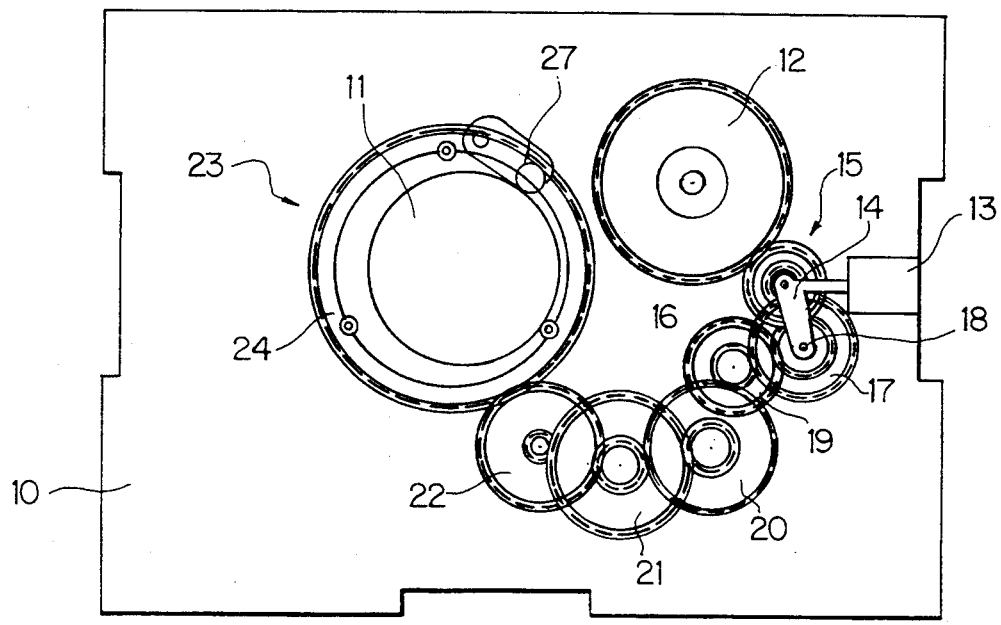
FIG. 1 is a schematic plan view illustrating a prior art loading device of a magnetic cassette tape recorder.
Figure 2:
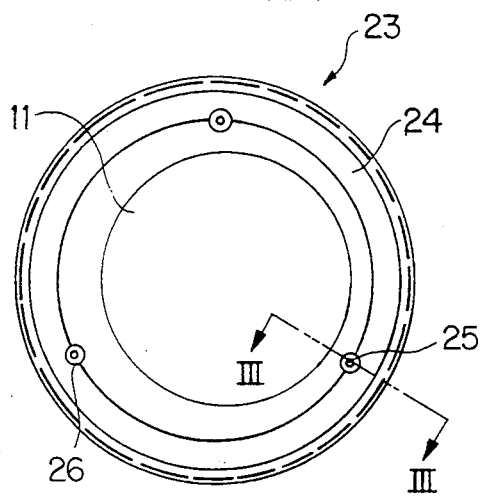
FIG. 2 illustrates a portion of the prior loading device shown in FIG. 1.
Figure 3:
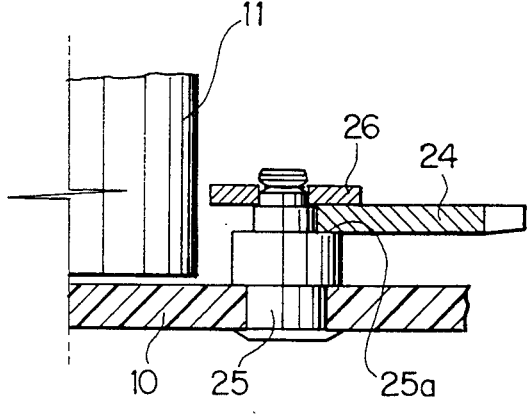
FIG. 3 is a cross-sectional view of the loading device taken along the line III—III as shown in FIG. 2A.
Figure 4:
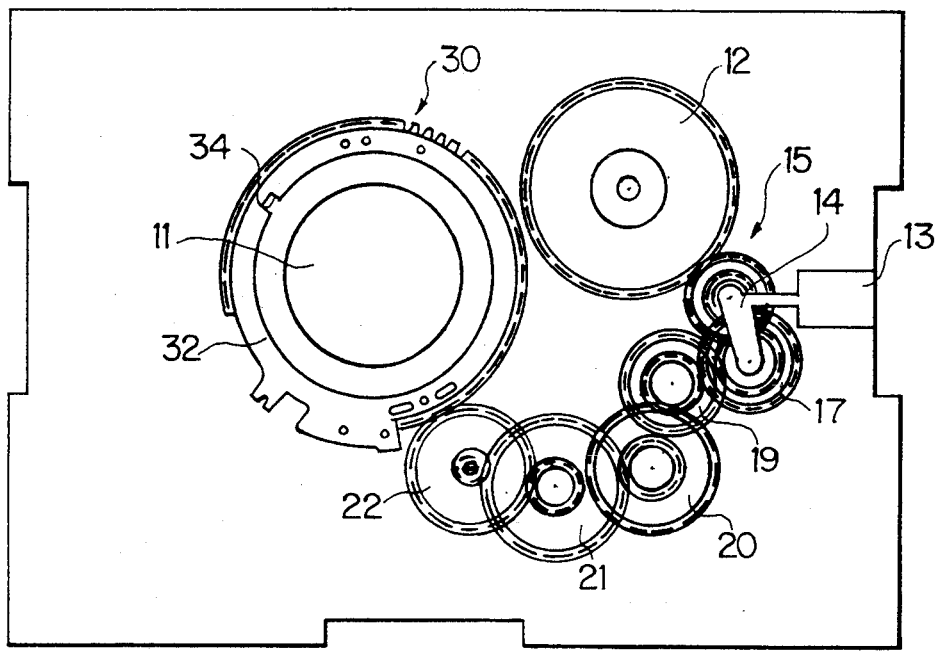
FIG. 4 is a schematic plan view of a loading device for a magnetic cassette tape recorder according to the present invention.
Figure 5:
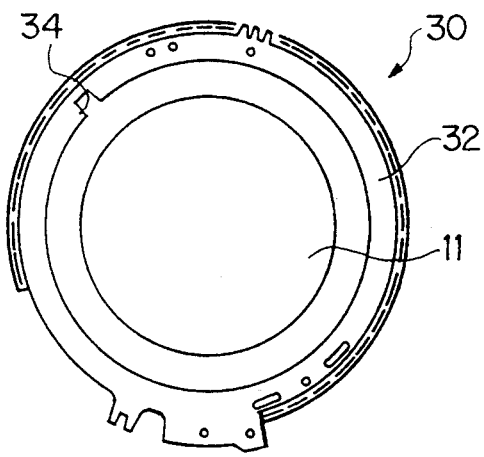
FIG. 5 is a plan view illustrating a ring gear of the loading device of FIG. 4.
Figure 6:
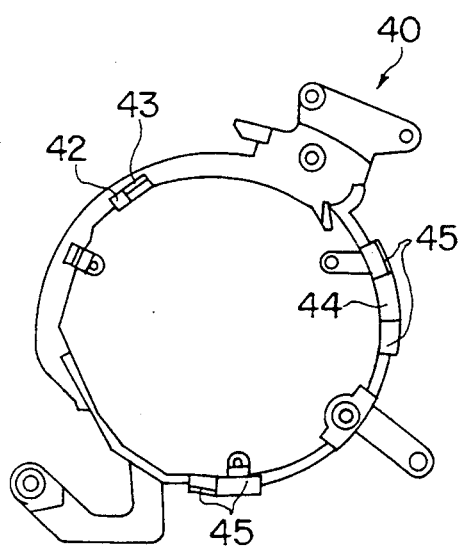
FIG. 6 is a bottom view of a guide rail of the loading device of FIG. 4 according to the present invention.
Figure 7:
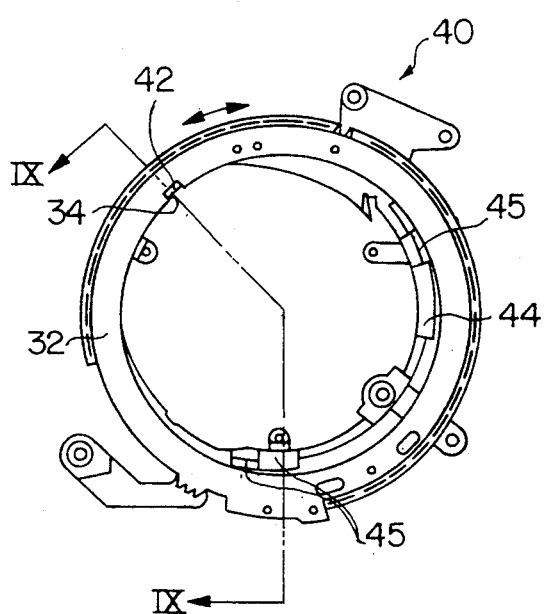
FIG. 7 is a bottom view illustrating the state wherein the ring gear is mounted on the guide rail.
Figure 8:
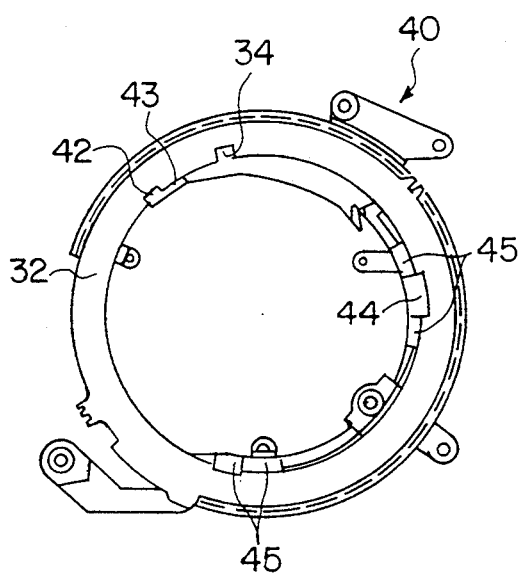
FIG. 8 is a bottom view illustrating the state wherein the loading device is rotated by a predetermined angle.
Figure 9:
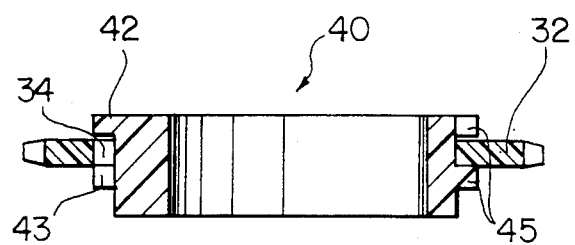
FIG. 9 is a cross-sectional view of the loading device taken along the line IX—IX as shown in FIG. 4.

FIG. 4 is a schematic plan view illustrating the loading device for a magnetic cassette tape recorder according to the present invention, in which the elements which are common to FIGS. 1 and 4 are represented by the same symbols.

A capstan motor 12 is positioned on a deck 10 for supplying the power to transfer to a drum 11 the magnetic tape of the tape cassette, which is mounted on the supply reel and the take-up reel hubs of the tape deck. An arm 14 is fixed on one end of a power converting means 15 having first and second gear parts 16 and 17 and positioned beside the capstan motor 12, the first and second gear parts 16 and 17 being engaged with each other and fixed in the arm 14 by an axis 18. The first through fourth gears 19, 20, 21, and 22 are sequentially engaged with each other, with the fourth gear 22 engaging the ring gear 32 and the first gear engaging the power converting means 15, so that power is supplied by the capstan motor to rotate the ring gear.

Now, referring to FIGS. 5 to 9, a fixing groove 34 is formed inside of the inner diameter of the ring gear 32 and mounted on a guide rail 40, having a rib 44. The rib 44 includes an inverted L-shaped projection 42 on the inner diameter of the guide rail 40 and a single stepped portion 43 integrally formed with the projection 42 by a predetermined gap.

The guide rail 40 is provided with the rib 44 integrally formed with a plurality of stepped portions 45 by a predetermined gap at the bottom of the outer diameter thereof.

The magnetic tape is loaded onto the drum 11 by the loading device of the present invention as follows. The capstan motor 12 rotates in a clockwise direction and selectively supplies power to the power converting means 15, which reduces the power through the series of the first through fourth gears 19–22, which are engaged with the second gear portion 17 of the power converting means 15. The ring gear 30 is engaged with the fourth gear 22 and rotates in a counterclockwise direction, thereby moving the pole base 27 in the direction to load the tape onto the drum 11. The ring gear 30 is rotated a predetermined angle by inserting in the fixing groove 34 the projection 42 formed at the bottom of the outer diameter of the guide rail 40 after the inside of the inner diameter of the ring gear 30 is inserted between single stepped portions 45 and the ring gear 30 is completely mounted on the guide rail 40.

For unloading the tape from the drum, the capstan motor 12 is rotated in a counterclockwise direction and the power is supplied via the power converting means 15 and gears 19 through 22 to ring gear 30 to rotate ring gear 30 in a clockwise direction, thereby moving the pole base 27 in a direction to unload the tape from the drum.

As above, the loading device for a magnetic cassette tape recorder according to the present invention simplifies the assembly process by improving the construction of the ring gear for loading and unloading the magnetic tape and the guide rail for mounting the ring gear to prevent the ring gear from deviating outwardly while it is rotating without any additional fixing member.

What is claimed is:

1. In a loading device for a magnetic cassette tape recorder of the type which loads and unloads a magnetic tape of a tape cassette, mounted on a supply reel and a take-up reel, to and from a drum mounted on a deck by means of a ring gear mounted on said deck, the improvement comprising:

a fixing groove formed at the inside of the inner diameter of said ring gear; and a guide rail for securing said ring gear to said deck having a part thereof which is inserted into said fixing groove of said ring gear;

means for rotating said ring gear along said guide rail in a said clockwise or counterclockwise direction.

2. The device according to claim 1, wherein said guide rail comprises a projection formed at the bottom of the inner diameter thereof, said projections being insertingly engaged with said fixing groove of said ring gear, and a rib formed at the bottom of the outer diameter of said guide rail and being engaged with the inner diameter of said ring gear.

3. The device according to claim 2, wherein said projection is formed at the bottom of the inner diameter of said guide rail and is of an inverted L-shape.

4. The device according to claim 2, wherein said rib comprises a single stepped portion integrally formed by a predetermined gap.

5. The device according to claim 4, wherein a plurality of said single stepped portions are formed on one side of said rib at different circumferential positions of said guide rail to be inserted in said ring gear.

* * * * *